W. F. Fitch,
Sawing Shingles.
№ 4,982.   Patented Feb. 27, 1847.

UNITED STATES PATENT OFFICE.

WILLIAM F. FITCH, OF NEWPORT, MAINE.

SHINGLE-MACHINE.

Specification of Letters Patent No. 4,982, dated February 27, 1847; Antedated August 27, 1846.

*To all whom it may concern:*

Be it known that I, WILLIAM F. FITCH, of Newport, in the county of Penobscot and State of Maine, have invented a new and valuble Improvement to Shingle-Machines; and I do hereby declare the following to be a full, clear, and exact description of the construction and operation thereof, reference being had to the accompanying drawings, making a part of this specification, in which—

Figure 1:
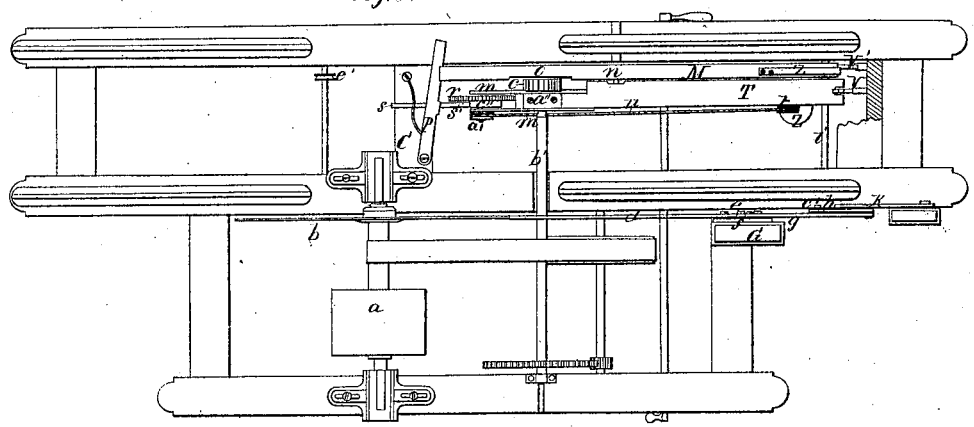
Figure 5:
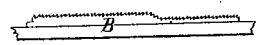
Figure 6:
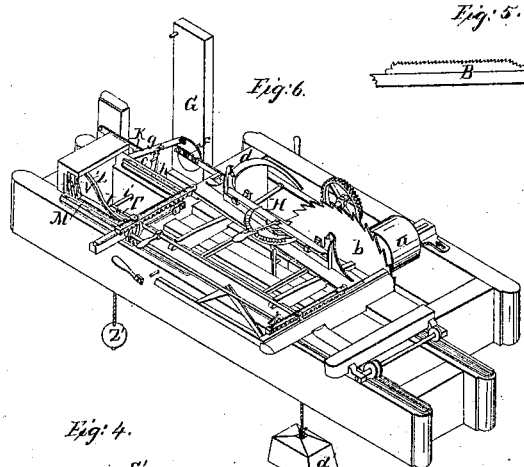
Figure 7:
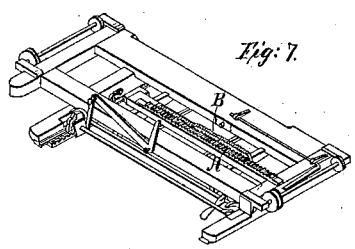
Figure 4:
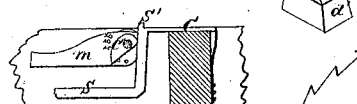
Figure 3:
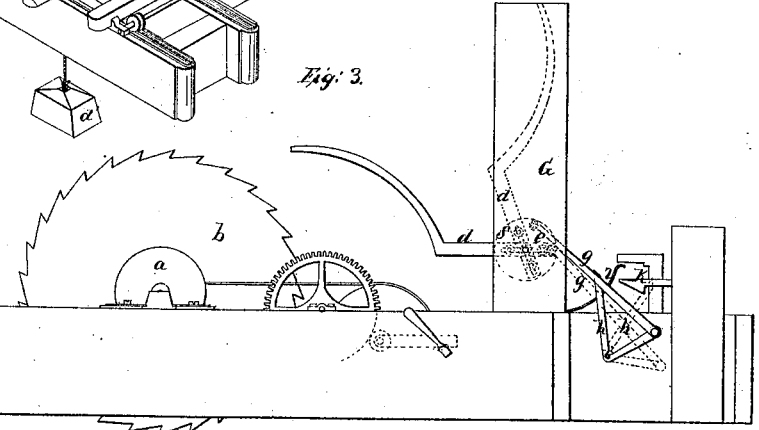
Figure 2:
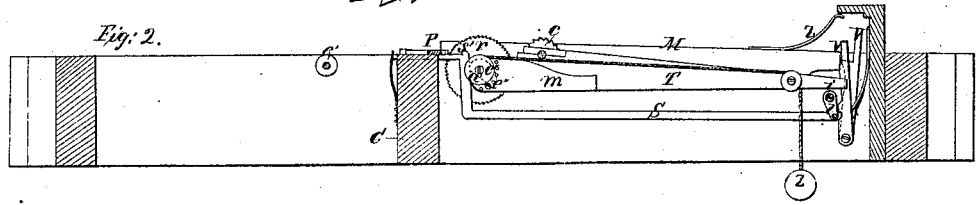

Figure 1 is a top view. Fig. 2, is a vertical longitudinal section. Fig. 3, is a side elevation. Fig. 4, is a broken section showing some of the parts in detail. Fig. 5, is an elevation of a rack (B) detached from the machine. Fig. 6, is a perspective view of a shingle machine complete. Fig. 7, is a perspective view of the under side of the carriage of the same.

It is well known that in shingle machines, constructed in the usual manner, the carriage must run so far as to bring the back end of the bolt or block to be sawed into shingles to the center of the saw before it is thrown out of gear and run back; this must be done for the purpose of enabling the saw to pass through the widest bolt it is capable of. As the bolts are of unequal width, when a narrow bolt is placed in the machine, the saw passes through and ceases to operate on the same, before the back end of the bolt reaches the center of the saw, therefore the time occupied after the shingle is sawed off, before the carriage is run back, is lost to the operator.

The nature of my invention consists in the attachment of a regulating apparatus to the shingle machine, which being properly adjusted for each bolt will cause the run of the carriage to correspond with the depth and length of the bolt to be sawed,— so arranged that the moment the saw has separated the shingle from, or has ceased to operate on the bolt, the carriage will be detached from the feeding apparatus and run back to be reset for another shingle.

The parts of the shingle machine well known, I shall not particularly describe, but confine myself to my adjustable apparatus for regulating the run of the carriage, and the manner in which it is combined and operates with the other parts of the machine.

$a$, is the driving pulley on the main shaft.
$b$, is the saw on the same.
$b'$, is the feeding shaft.
$c$, is a pinion on the same meshing into the rack A, on the under side of the carriage, in the usual manner.

The inner end of the feeding shaft $b'$, has its bearing in a vibrating bar M at $o$; the bar M, has its bearing at $n$, on a pin inserted into the side piece of the supporting frame.

$z$, is a spring attached to the upper side of the rear end of bar M.

The carriage (after the feed regulating apparatus has acted) is run back by a weight $d'$, Fig. 6 and a cord passing over the pulley $e'$, Fig. 1, in the usual manner; when the carriage is run back its rear axle removes a supporter $v'$ from under the rear end of the vibrating bar M, at the same time pressing on the spring $z$, forcing down the rear end of M, and elevating its front end so that a spring latch $p$, passes under the same, and retains the front end of the bar in an elevated position,—in which position the pinion $c$, meshes into the rack A, and carries forward the carriage until the latch $p$, is forced by the regulating apparatus from under the front end of the vibrating bar (M,) when the weight of the machinery attached to it causes it to descend permitting the spring supporter $v'$ to catch under its rear end, throwing the pinion $c$, out of gear with the rack, and allowing the carriage to run back by cord and weight $d'$ attached to it.

In the machines heretofore constructed, the latch $p$, is detached by a pin or stud projecting from the carriage, or by some analogous means, but I detach it by means of my adjustable regulating apparatus as follows. By the side of the usual vibrating bar M, I place a vibrating bar T, supported by and vibrating on the feeding shaft $b'$, at $a''$. Metallic plates $m$, $m$, are secured to each side of the front end of the bar T, projecting in front of the same, supporting a pinion $r$, and cam $c''$, between the plates, and the pulley $a'$, on the outer side of one of them—all on the same axle. Near the rear end of the bar T, is placed a pulley $t$, on the side of the same, a cord $u$, is attached to the front pulley ($a'$,) and carried from that to, and over, the rear pulley $t$, to the end of which the weight $z'$, is attached for the purpose hereinafter explained. By the side of the usual rack A, I secure to the under side of the carriage a rack B, about one half the length of which, from its front end, it descends to the same depth of the face of rack A; the remainder of B, descends to about double the depth of A. The reason of this formation of the rack B, will be explained a little farther on. The cam $c''$, detaches the latch $p$, from under the front end of the bar M, and is operated by means of the forward movement of the rack B, taking into and turning the pinion $r$, when the rear end of T, is detached from the spring supporter $v$, and is drawn down by the weight $z'$. The spring supporter $v$, retains the bar T, in a horizontal position, in which position the front half of the rack B, does not mesh into the pinion $r$; the after half of B, however is of sufficient depth to take hold of, and operate the pinion $r$, while the bar T, is in this (horizontal) position. The position of the point of the cam $c''$, is so adjusted by means of the regulating screw $e''$, and the gaging apertures $x$, $x$, in the plates $m$, $m$, that the cam will detach $p$, and allow the carriage to run back the moment the saw ceases to operate upon the bolt. The following are the parts combined and operating with each other, for detaching the spring supporter $v$, from under the rear end of the bar T, and thereby causing the pinion $r$, and the cam $c''$, to be operated by the rack B, viz, the gage $d$, the vibrating disk $f$, the connecting bar $g$, the bent lever $h$, the arbor $i$, and the rod $s$. The gage $d$, is composed of an arc united to a straight arm, and is secured to the disk $f$, by screws passing through a slot in the straight portion of $d$, into the disk. The vibrating disk $f$, is secured to the rear side of the post G, by the axle pin $e$; the disk $f$, is connected to the short arm of the bent lever $h$, by the connecting rod $g$, united to the two by joint pins; the arbor $i$, runs transversely through the machine, under the rear ends of bars M and T, its front end passes through an aperture at the angle of the bent lever $h$, to which it is permanently secured; the long arm of the bent lever $h$, rises nearly vertically, and has a latch pin $c'$, projecting from its rear side, for the purpose hereinafter set forth.

$l$, is an arm descending from the arbor $i$, immediately in front of the spring supporter $v$; the rod $s$, is jointed at its rear end to the lower end of the arm $l$, and extends forward in a horizontal direction, passing directly under the cam $c''$, and to a short distance in front of it, where it turns and rises by the side of the cross piece C, to the top of the same, when it turns again and passes horizontally forward through a channel in the top of C, and projects a few inches in front of the same; a lip $s'$, projects from the upper angle of the rod $s$, which fits against the rear side, and operates the spring latch $p$. When the rod $s$, is moved forward (by the cam $c''$, acting against its vertical portion) it vibrates the arbor $i$, and removing the rear end of $s$, from the front of the spring supporter $v$, alows the same to pass under the rear end of the bar T, (when elevated by the deep part of the rack B, pressing upon the pinion $r$.) The vibration of the arbor $i$, (by the forward movement of rod $s$,) acting on the bent lever $h$, connecting bar $g$, and disk $f$, elevates the gage $d$, and passes the latch pin $c'$ (on the long arm of $h$) under the latch $k$, and thereby retains the gage in an elevated position; the moment after the gage $d$, has been caught and retained in an elevated position, the forward movement of $s'$, disengages the latch $p$, and allows the front end of the bar M, to descend, (vibrating on $n$,) carrying with it the front end of the bar T, (connected to the same by the feeding shaft $b'$) and thereby disengages the pinions $c$, and $r$, from the racks A, and B, and allows the carriage to run back and reset the bolt for a shingle in the usual manner. As soon as the pinion $r$, is disengaged from the rack B, the weight $z'$, (connected to the pulley $a'$, by the cord $u$,) throws back the point of the cam on to the regulating screw $e''$; the weight $z'$, serving the double purpose of throwing back the point of the cam after it has operated, and of depressing the rear end of M, after the supporter $v$, has been pressed from under it.

The carriage in running back, is prevented from coming in violent contact with the rear end of the machine by its rear axle's pressing upon the spring Z. When the carriage reaches the rear end of the machine, its rear axle presses the supporter $v'$, from under the rear end of the bar M, at the same time forcing down the bar through the medium of the spring Z, and allowing the spring latch $p$ to pass under its front end, as before described; the rear axle of the carriage also, (as it reaches the rear end of the machine,) passes under and raises the latch $k$, and allows the gage $d$, to fall forward upon the bolt. The forward movement of the carriage (by the action of the pinion $c$,) moves the bolt from under the curved portion of the gage $d$, allowing it to descend until the straight portion of the same is brought to a horizontal position; at which moment, the action of the gage upon the disk $f$, bar $g$, lever $h$, and arbor $i$, forces the rear end of $s$, against the supporter $v$, and removes it from under the rear end of the bar T, allowing the same to descend, and thereby throwing the pinion $r$, into gear with the rack B. When by the forward movement of the rack B, its deep portion reaches the pinion $r$, it forces down the same, and thereby elevating the rear end of the bar T, allows the supporter $v$, to spring under the same and support the bar in a horizontal position.

A bolt is sometimes placed upon the carriage so deep that the saw passes through and ceases to operate upon the same, without allowing the straight portion of the gage to descend to a horizontal position. In which case, the deep portion of the rock will operate the pinion $r$, and cam $c''$, while the bar T, remains in a horizontal position, and will thereby detach the carriage and allow it to run back at the proper moment. The cam $c''$, and gage $d$, can be so adjusted in relation to each other, that the moment the saw passes through and ceases to operate on the bolt, the pinions $c$, and $r$, will be detached from the rocks and the carriage run back. The position of the gage $d$, can be adjusted upon the disk $f$, by means of the slot in the gage, and the attaching screws. The curve of the under side of the arc of the gage $d$, is the same radius of the saw, and when the straight part of $d$, is in a horizontal position, the center of the arc of the gage, is in a horizontal line with the center of the saw; and consequently, its under side is parallel with, and equidistant, in a horizontal line, with the points of the teeth of the saw, from the top of the same down its front edge, a distance corresponding with the arc of the gage. It therefore follows, that the bolt, in all cases, whether it be deep or shallow, long or short, will leave the gage at exactly the same distance from the teeth of the saw; hence it will be an easy matter to so adjust the cam $c''$, as to run the carriage back at the proper moment. An inclined arm would answer in place of the arc of the gage, and may be used if preferred; but it will readily be perceived, that with a gage of that form, the block would have to travel a longer distance to bring the portion of the gage attached to the disk $f$, to a horizontal position, it could not therefore be so readily adjusted with the cam $c''$, and the machine could not be constructed of so compact a form.

Having thus fully described the construction and operation of my improvement to shingle machines, what I claim as new and desire to secure by Letters Patent, is—

The regulating the run of the carriage to correspond with the depth or length of the blocks or bolts to be sawed, by means of the adjustable gage $d$, disk $f$, bar $g$, bent lever $h$, arbor $i$, arm $l$, rod $s$, adjustable cam $c''$, pinion $r$, vibrating bar T, pulleys $a'$, and $t$, cord $u$, weight $z'$, supporter $v$, latch $k$, and the rack B, combined and operating with each other and with the spring latch $p$, and vibrating bar M, substantially in the manner herein set forth.

WILLIAM F. FITCH.

Witnesses:
  Z. C. ROBBINS,
  EDWIN L. BRUNDAGE.